Oct. 22, 1935.                C. F. MEYER                2,018,460
                       STRAIGHT KNITTING MACHINE
                         Filed Aug. 16, 1932
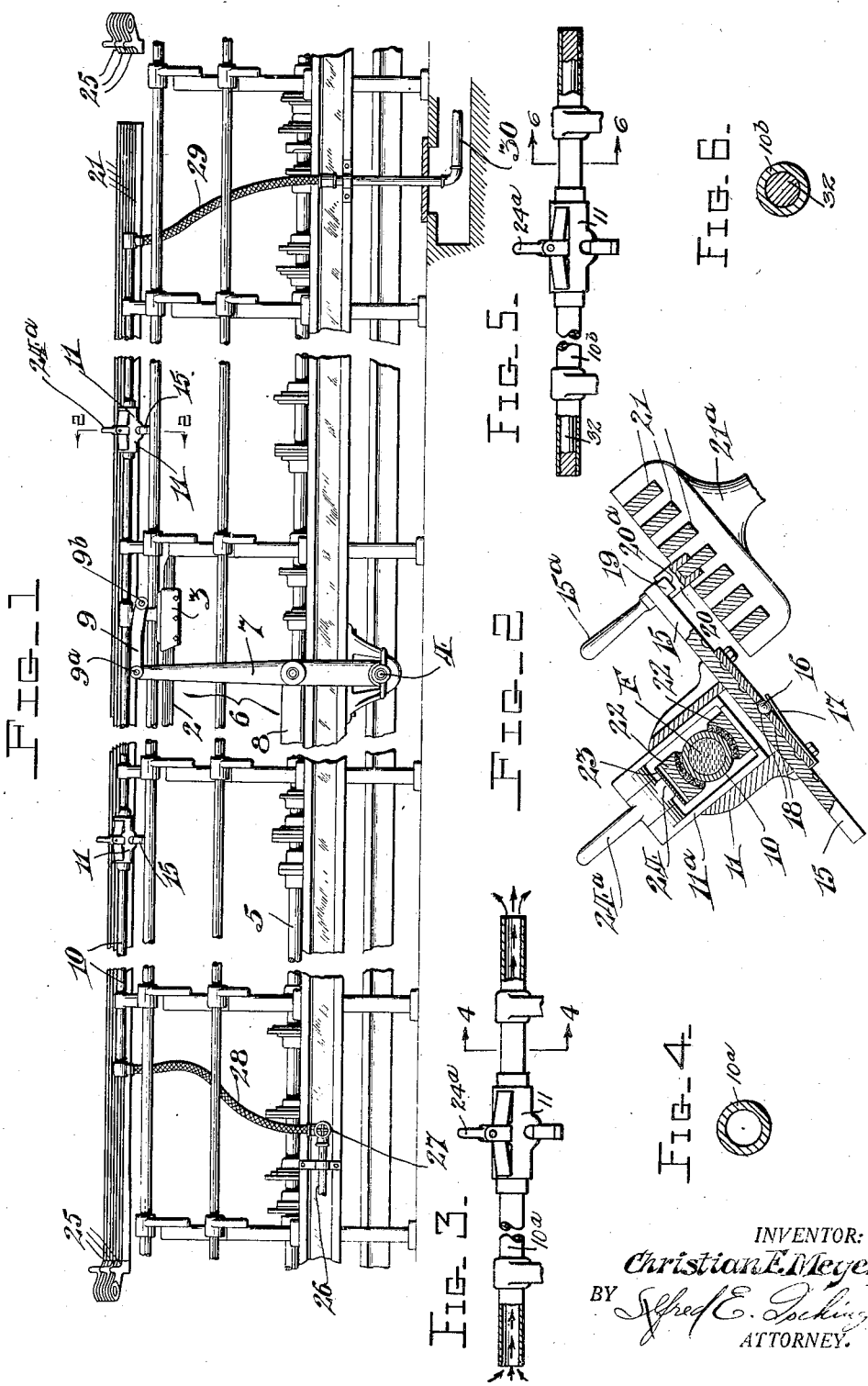
INVENTOR:
Christian F. Meyer,
BY
      ATTORNEY.

Patented Oct. 22, 1935

2,018,460

UNITED STATES PATENT OFFICE 2,018,460

STRAIGHT KNITTING MACHINE

Christian F. Meyer, Wyomissing, Pa., assignor to Textile Machine Works, Wyomissing, Pa., a corporation of Pennsylvania Application August 16, 1932, Serial No. 628,967

3 Claims. (Cl. 66—126)

This invention relates to straight knitting machines, and more particularly to the thread carrier rod actuating mechanism and means whereby uniform, smooth and efficient operation of certain friction parts thereof is obtained.

The rod for actuating the thread carrier rods or bars in a straight knitting machine is linked to a coulier type of oscillating mechanism, so that the actuating rod is oscillated or reciprocated, thereby to reciprocate the thread carrier rods across the knitting section. For various operations, such as narrowing, plating and splicing, it is necessary to vary the thread carrier travel; therefore, during these operations the thread carrier rods are arrested in their travel by means of carrier rod end stops, or by intermediate arresting devices. The thread carrier rods are connected by adjustable couplings to gripping devices or friction boxes positioned on the actuating rod in sliding frictional engagement therewith, so that when the actuating rod (commonly called the friction rod) is reciprocated by the coulier mechanism, the carrier rods may be arrested in their travel without stopping the friction rod, movement of which continues until its limit of travel, as determined by the coulier motion, is reached. Considerable heat is generated when the friction boxes are thus forced to axially slide on the friction rod, and the heat developed in the friction rod and friction boxes affects or prevents smooth and uniform gripping and sliding coaction between the friction rod and the boxes, and impairs in various ways the efficiency and operation of these elements.

One detrimental effect due to heating of the friction rod is as follows: In order to obtain the desired adhesion between the rod and those parts of the friction boxes, especially the leather friction shoes, which engage the rod, a suitable grease, oil or other substance, which also acts as a lubricant, is applied to the rod and friction shoes. Heating of the rod causes the grease or oil to run off or disappear, so that the rod and friction shoes become dry, thus losing the desired adhesive effect, and also causing overheating of the friction parts due to lack of a lubricant. The heat generated may also cause scoring of the actuating rod surfaces, and the necessity of frequent replacements of friction shoes, with the attendant disadvantages of interference with the continuous operation of the machine.

An important object of this invention is to provide suitable means whereby the temperature of an actuating member, for example, the friction rod of a straight or full-fashioned knitting machine, upon which friction gripping devices act, is controlled, or the temperature rise limited, by a cooling medium in good heat transfer relation with the actuating member. Specifically, and as shown in one form, the friction rod is hollow, and a cooling fluid flows through the rod to carry away the heat and prevent temperature rise in the rod or friction gripping devices. In another form, the rod is hollow, or has a hollow portion, to which a cooling medium, such as a copper rod, is applied, as will hereinafter appear.

Another object of the invention is to minimize or prevent disappearance from the friction parts of the grease or other substance necessary to cause proper coaction between the parts, and to maintain the sliding coaction between the friction rod and friction gripping devices substantially uniform and smooth, notwithstanding extended periods of continuous operation of the machine.

A further object is to provide suitable means for keeping the temperature of a friction rod in a knitting machine uniform throughout the length of the rod.

The invention further resides in the novel features of construction, combination and arrangement of parts hereinafter described and claimed.

In order to describe the invention, and for illustration of several of the various forms it may take, reference is had to the accompanying drawing, in which:

Fig. 1 is a fragmentary view of a full-fashioned knitting machine embodying the invention;

Fig. 2 is an enlarged sectional view taken on the line 2—2 of Fig. 1;

Fig. 3 illustrates a modified form of the invention;

Fig. 4 is an enlarged sectional view taken on the line 4—4 of Fig. 3;

Fig. 5 shows another form of the invention; and

Fig. 6 is an enlarged sectional view taken on the line 6—6 of Fig. 5.

In Fig. 1, a rear view of a straight knitting machine is shown and those parts relative to the operative connection of the actuating member or friction rod 10. A coulier motion mechanism, generally indicated at 6, has a lever 7 which is rocked on a pivotal base 4 by pitman 8 reciprocated by coulier cam members (not shown) connected to the camshaft 5. A link 9 is pivotally connected at 9a to one end of the rocking lever 7, and is pivotally connected at 9b to a reciprocable crosshead slide 3 having one end movable on a guide bar 2, and which is fastened at its other end to the friction rod 10. The coulier motion mechanism referred to is well known in the art, and is illustrated in my prior Patent No. 1,821,982, issued Sept. 8, 1931; it is therefore not shown or described here in detail. The crosshead 3 is reciprocated by the rocking lever 7, through the connecting link 9; consequently, the friction rod 10 is reciprocated by and in accordance with the crosshead. Gripping devices or boxes 11 frictionally engage the friction rod 10, and are connected by adjustable couplings to thread carrier bars 21.

Fig. 2 illustrates in cross-section the members of the frictional gripping devices or boxes 11, which are maintained on the rod 10 by adjustable friction shoes 22. A coupling or positioning bar 15 is slidably adjustable in the base of the friction box 11 to any one of several positions to engage with any desired thread carrier bar, and a detent ball 16 and spring 17 positioned on the friction box base coact with detents 18 to maintain the coupling 15 in the desired position. The coupling may be pulled by its handle 15a, and is held in interlocking relation with any desired one of the thread carrier bars 21 on the bar support member 21a by means of a stud 19 which engages a notch 20a in a dog 20 securely fixed, as by rivets or machine screws, to the desired thread carrier bar.

The friction box 11 has two shoe blocks 22 held within a frame 11a, with a leaf spring 23 interposed between the rocking cam member 24 and the upper shoe block so that the adjustment of the cam member by the lever 24a presses the shoe blocks 22 into frictional engagement with the hollow rod 10. In Fig. 1 there are but two friction boxes shown engaging the rod 10; it will be understood, however, that additional friction boxes may be used, so that any desired number of bars 21 may be controlled by the actuating rod 10, one friction box being used with and individual to each thread carrier bar so controlled.

During the reciprocating motion of the thread carrier rods, it becomes necessary to stop some of the carrier rods in their paths sooner than the completion of the coulier oscillating movement; this is done by means of end stops 25 at the ends of the bars 21, or by any other suitable form of intermediate stopping devices. When a thread carrier rod is stopped by any of such above means, there follows a frictional sliding movement of its associated friction box on the surface of the actuating or friction rod, and undesirable or excessive heat is generated thereby.

A fluid medium F, such as water, oil, air, vapor, or other suitable cooling medium from a source of supply 26 is caused to flow through flexible connection 28, rod 10, flexible connection 29, and discharge line 30, the rate of flow being preferably controlled by a regulating valve 27, to carry off at a predetermined rate the heat generated. The flexible connections 28 and 29 may comprise hose sections, and are of sufficient length to permit the necessary reciprocation of friction rod 10. The arrangement disclosed permits a cooling medium of predetermined temperature to be introduced at such rate of flow as to conduct sufficient heat from the friction rod 10 and friction boxes 11 to maintain a substantially uniform and predetermined temperature at all times, thereby minimizing or preventing loss from the surfaces of the friction rod and brake shoes of the grease, oil or other adhesive substance employed, and causing the sliding coaction between the friction rod and friction boxes to be uniform and smooth, and minimizing or preventing scoring of the friction rod and wear on the friction shoes.

In the embodiment illustrated in Figs. 1 and 2, the actuating member or friction rod is hollow, and cooling water under pressure is caused to flow through the rod, but it is possible, by suitable design of the various elements, to employ a hollow rod 10a, Figs. 3 and 4, bored so that natural circulation of the air therethrough, as indicated by arrows in Fig. 3, will suitably limit the temperature rise; also, a solid or semi-solid substance, for example, copper, salts, or other substances having high thermal conductivity within the friction rod, such as shown in Figs. 5 and 6 in which the friction rod 10b has therein a copper rod 32, or equivalent, in good heat transfer relation with the friction rod so that it will dissipate or conduct heat away from those portions of the rod in which excessive heat is generated, at a rate to prevent hot spots and suitably limit the temperature rise of the rod.

Various modifications and uses of the invention will readily suggest themselves to those skilled in the art without the exercise of inventive skill, and without departing from the spirit and scope of the invention as defined by the appended claims.

I claim:

1. A straight knitting machine comprising a yarn carrier, and operating means for the carrier including a longitudinally reciprocable friction rod having a hollow portion, a friction box having friction-grip connection to the rod for movement therewith to operate the carrier, means for limiting movement of the box with the rod and causing it to slip relative thereto, and means for maintaining substantially uniform the gripping and sliding coaction between the rod and the box including means affecting the temperature of the rod and the box, said temperature affecting means including means for applying a cooling medium to the interior of said hollow friction-rod portion during reciprocation of the rod.

2. A straight knitting machine comprising a yarn carrier, and operating means for the carrier including a longitudinally reciprocable friction rod having a hollow portion, a friction box having friction-grip connection to the rod for movement therewith to operate the carrier, means for limiting movement of the box with the rod and causing it to slip relative thereto, and means for maintaining substantially uniform the gripping and sliding coaction between the rod and the box including means affecting the temperature of the rod and the box, said temperature affecting means including means for feeding a fluid to said hollow friction-rod portion from a source of fluid outside the rod during reciprocation of the rod.

3. A straight knitting machine comprising a yarn carrier, and operating means for the carrier including a longitudinally reciprocable tubular friction rod, a friction box having friction-grip connection to the rod for movement therewith to operate the carrier, means for limiting movement of the box with the rod and causing it to slip relative thereto, and means for maintaining substantially uniform the gripping and sliding coaction between the rod and the box including means affecting the temperature of the rod and the box, said temperature affecting means including a stationary conduit terminal, a conduit terminal on the rod, and means providing a sealed communicating fluid passageway between, and compensating for relative movement of, said terminals.

CHRISTIAN F. MEYER.